(12) United States Patent
Guo et al.

(10) Patent No.: US 9,535,493 B2
(45) Date of Patent: Jan. 3, 2017

(54) APPARATUS, METHOD, COMPUTER PROGRAM AND USER INTERFACE

(75) Inventors: Yongguang Guo, Beijing (CN); Shiming Ge, Beijing (CN)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 13/640,654

(22) PCT Filed: Apr. 13, 2010

(86) PCT No.: PCT/CN2010/071718
§ 371 (c)(1),
(2), (4) Date: Oct. 11, 2012

(87) PCT Pub. No.: WO2011/127646
PCT Pub. Date: Oct. 20, 2011

(65) Prior Publication Data
US 2013/0033459 A1    Feb. 7, 2013

(51) Int. Cl.
*G06F 3/01*     (2006.01)
*G06F 3/0346*   (2013.01)
*G06F 3/0481*   (2013.01)

(52) U.S. Cl.
CPC .............. *G06F 3/011* (2013.01); *G06F 3/017* (2013.01); *G06F 3/0346* (2013.01); *G06F 3/04815* (2013.01)

(58) Field of Classification Search
CPC ........ G06F 3/011; G06F 3/017; G06F 3/0346; G06F 3/04815
USPC .................................................. 345/175, 173
See application file for complete search history.

(56) References Cited

U.S. PATENT DOCUMENTS

| 5,483,261 | A |   | 1/1996 | Yasutake |
|---|---|---|---|---|
| 6,043,818 | A | * | 3/2000 | Nakano ............... G06F 3/04815 345/473 |
| 6,198,485 | B1 |   | 3/2001 | Mack |
| 6,624,833 | B1 |   | 9/2003 | Kumar |
| 7,512,902 | B2 | * | 3/2009 | Robertson ............. G06F 3/0481 715/782 |
| 7,823,089 | B2 | * | 10/2010 | Wilson .......................... 715/863 |
| 8,094,120 | B2 | * | 1/2012 | Ratai ............................ 345/156 |
| 8,166,421 | B2 | * | 4/2012 | Magal et al. ................. 715/863 |

(Continued)

FOREIGN PATENT DOCUMENTS

| CN | 101344816 | 1/2009 |
|---|---|---|
| WO | WO-03/079179 | 9/2003 |

OTHER PUBLICATIONS

Grossman, T., Wigdor, D. and Balakrishnan, R. Multi-Finger Gestural Interaction with 3D Volumetric Displays. Proc. UIST '04, 2004, pp. 61-70.*

(Continued)

*Primary Examiner* — Dmitriy Bolotin
(74) *Attorney, Agent, or Firm* — Alston & Bird LLP (57) ABSTRACT

An apparatus, method, computer program and apparatus wherein the apparatus comprises: at least one processor: and at least one memory including computer program code; wherein the at least one memory and the computer program code are configured to, with the at least one processor, enable the apparatus to; detect, using a camera, motion of a user input object; and determine, for performance, a function corresponding to the detected motion of the user input object wherein the function comprises control of an entity within a three dimensional model.

20 Claims, 5 Drawing Sheets

(56) References Cited

U.S. PATENT DOCUMENTS

| | | | |
|---|---|---|---|
| 8,249,334 B2* | 8/2012 | Berliner et al. | 382/154 |
| 8,456,517 B2* | 6/2013 | Spektor et al. | 348/43 |
| 8,494,252 B2* | 7/2013 | Freedman et al. | 382/154 |
| 8,612,894 B2* | 12/2013 | Kim | G06F 3/017 715/863 |
| 2002/0057383 A1* | 5/2002 | Iwamura | 348/734 |
| 2004/0155902 A1 | 8/2004 | Dempski et al. | |
| 2005/0083314 A1 | 4/2005 | Shalit et al. | |
| 2005/0166163 A1* | 7/2005 | Chang et al. | 715/863 |
| 2006/0212828 A1* | 9/2006 | Yahiro | G06F 3/04815 715/810 |
| 2006/0288308 A1* | 12/2006 | Enomoto | G06F 3/0338 715/811 |
| 2007/0097113 A1* | 5/2007 | Lee | G06F 3/0346 345/419 |
| 2007/0252832 A1* | 11/2007 | Ratai | 345/427 |
| 2009/0077504 A1* | 3/2009 | Bell et al. | 715/863 |
| 2009/0096783 A1* | 4/2009 | Shpunt et al. | 345/419 |
| 2009/0183125 A1* | 7/2009 | Magal et al. | 715/863 |
| 2010/0007717 A1* | 1/2010 | Spektor et al. | 348/43 |
| 2010/0053151 A1 | 3/2010 | Marti et al. | |
| 2010/0060570 A1 | 3/2010 | Underkoffler et al. | |
| 2010/0265316 A1* | 10/2010 | Sali et al. | 348/46 |
| 2010/0306685 A1* | 12/2010 | Giaimo et al. | 715/765 |
| 2011/0018795 A1* | 1/2011 | Jang | 345/156 |
| 2011/0193939 A1* | 8/2011 | Vassigh | G06F 3/011 348/46 |
| 2012/0157208 A1* | 6/2012 | Reville | G06F 3/017 463/39 |
| 2012/0200495 A1* | 8/2012 | Johansson | 345/156 |

OTHER PUBLICATIONS

Hang, D.; "Elementary Conception of Interaction Based on Gesture and Actuality 3D Display;" Advanced Display; Dec. 2008; No. 95; pp. 20-25,29; ISSN 1006-6268.

International Search Report for Application No. PCT/CN2010/071718, dated Jan. 20, 2011.

Extended European Search Report for corresponding European Application No. 10849656.3 dated Apr. 18, 2016, 10 pages.

Office Action for corresponding Chinese Application No. 201080066841.2 dated Apr. 18, 2016.

International Written Opinion for Application No. PCT/CN2010/071718, dated Jan. 20, 2011.

Eldridge, R. et al., *Stereo Vision for Unrestricted Human-Computer Interaction, Stereo Vision*, In Tech (Nov. 2008) 49-58.

Jenabi, M. et al., *Finger Interaction with Mobile Phone*, Paper presented at: Future Mobile Experiences, Workshop at NordiCHI 2008. Retrieved from the Internet: <URL: https://kops.uni-konstancz.de/bitstream/handle/123456789/5803/Finteraction.pdf?sequence=1>, 4 pages.

*LucidTouch touchscreen lets you control from both sides—Sparking Tech* [online] [retrieved Oct. 2, 2012]. Retrieved from the Internet: <URL:sparkingtech.com/design/lucidtouch-touchscreen-lets-you-control-from-bothsides/>. (Mar. 12, 2008) 3 pages.

Shen, E. et al., *Double-side Multi-touch Input for Mobile Devices*, CHI 2009, ACM (Apr. 2009) 6 pages.

Winkler, S. et al., *Tangible Mixed Reality Desktop for Digital Media Management* [online][retrieved May 6, 2016]. Retrieved from the Internet: <URL:http://stefan.winkler.net/Publications/spie6490.pdf>. 10 pages.

\* cited by examiner

APPARATUS, METHOD, COMPUTER PROGRAM AND USER INTERFACE

FIELD OF THE INVENTION

Embodiments of the present invention relate to an apparatus, method, computer program and user interface. In particular, they relate to an apparatus, method, computer program and user interface for enabling a user to make user input using a camera.

BACKGROUND TO THE INVENTION

Apparatus which enable a user to make inputs to control the apparatus are well known. There are many different ways a user can make an input. It is useful for the inputs for controlling the apparatus to be simple and intuitive for the user to make.

BRIEF DESCRIPTION OF VARIOUS EMBODIMENTS OF THE INVENTION

According to various, but not necessarily all, embodiments of the invention there is provided an apparatus comprising: at least one processor: and at least one memory including computer program code; wherein the at least one memory and the computer program code are configured to, with the at least one processor, enable the apparatus to; detect, using a camera, motion of a user input object; and determine, for performance, a function corresponding to the detected motion of the user input object wherein the function comprises control of an entity within a three dimensional model.

In some embodiments of the invention the three dimensional model may comprise a three dimensional vector space. The three dimensional model may comprise one or more three dimensional entities within the three dimensional vector space.

In some embodiments of the invention the entity which is controlled may be a three dimensional entity and has depth, width and height. In other embodiments of the invention the entity which is controlled may be a cursor which enables a user to select items within the three dimensional model and the function performed may comprise selection of an item using the entity.

In some embodiments of the invention the function performed may comprise movement of the entity within the three dimensional model. The movement may comprise translation of the entity and or rotation of the entity.

In some embodiments of the invention the at least one memory and the computer program code may be configured to, with the at least one processor, enable the apparatus to display a representation of the three dimensional model on a display.

In some embodiments of the invention the user input object may comprise part of the user's hand. The user input object may comprise one or more fingers. In other embodiments of the invention the user input object may comprise a stylus.

In some embodiments of the invention the detected motion of the user input object may comprise three dimensional motion.

In some embodiments of the invention the detected motion of the user input object may comprise a gesture.

According to various, but not necessarily all, embodiments of the invention there is also provided a method comprising: detecting, using a camera, motion of a user input object; and determining, for performance, a function corresponding to the detected motion of the user input object wherein the function comprises control of an entity within a three dimensional model.

In some embodiments of the invention the three dimensional model may comprise a three dimensional vector space. The three dimensional model may comprise one or more three dimensional entities within the three dimensional vector space.

In some embodiments of the invention the entity which is controlled may be a three dimensional entity and has depth, width and height. In other embodiments of the invention the entity which is controlled may a cursor which enables a user to select items within the three dimensional model. The function performed may comprise selection of an item using the entity.

In some embodiments of the invention the function performed may comprise movement of the entity within the three dimensional model. The movement may comprise translation of the entity or rotation of the entity.

In some embodiments of the invention the method may also comprise displaying a representation of the three dimensional model on a display.

In some embodiments of the invention the user input object may comprise part of the user's hand. The user input object may comprise one or more fingers. In other embodiments of the invention the user input object may comprise a stylus.

In some embodiments of the invention the detected motion of the user input object may comprise three dimensional motion.

In some embodiments of the invention the detected motion of the user input object comprises a gesture.

According to various, but not necessarily all, embodiments of the invention there is also provided a computer program comprising computer program instructions that, when executed by at least one processor, enable an apparatus at least to perform: detecting, using a camera, motion of a user input object; and determining, for performance, a function corresponding to the detected motion of the user input object wherein the function comprises control of an entity within a three dimensional model.

In some embodiments of the invention there may also be provided a computer program comprising program instructions for causing a computer to perform the method as described above.

In some embodiments of the invention there may also be provided a physical entity embodying the computer program as described above.

In some embodiments of the invention there may also be provided an electromagnetic carrier signal carrying the computer program as described above.

According to various, but not necessarily all, embodiments of the invention there is also provided a user interface comprising: user input means configured to detect, using a camera, motion of a user input object; a display configured to display a representation of a three dimensional model; wherein, in response to the detection of the motion of the user input object, a function is performed comprising control of an entity within the three dimensional model.

In some embodiments of the invention the three dimensional model may comprise a three dimensional vector space.

According to various, but not necessarily all, embodiments of the invention there is also provided an apparatus comprising: means for detecting, using a camera, motion of a user input object; and means for determining, for performance, a function corresponding to the detected motion of the user input object wherein the function comprises control of an entity within a three dimensional model.

In some embodiments of the invention the three dimensional model may comprise a three dimensional vector space.

The apparatus may be for wireless communication.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures illustrate an apparatus 1 comprising: at least one processor 3: and at least one memory 5 including computer program code 9; wherein the at least one memory 5 and the computer program code 9 are configured to, with the at least one processor 3, enable the apparatus 1 to; detect, using a camera 17, motion of a user input object 35; and determine, for performance, a function corresponding to the detected motion of the user input object 35 wherein the function comprises control of an entity 39 within a three dimensional model.

Figure 1:
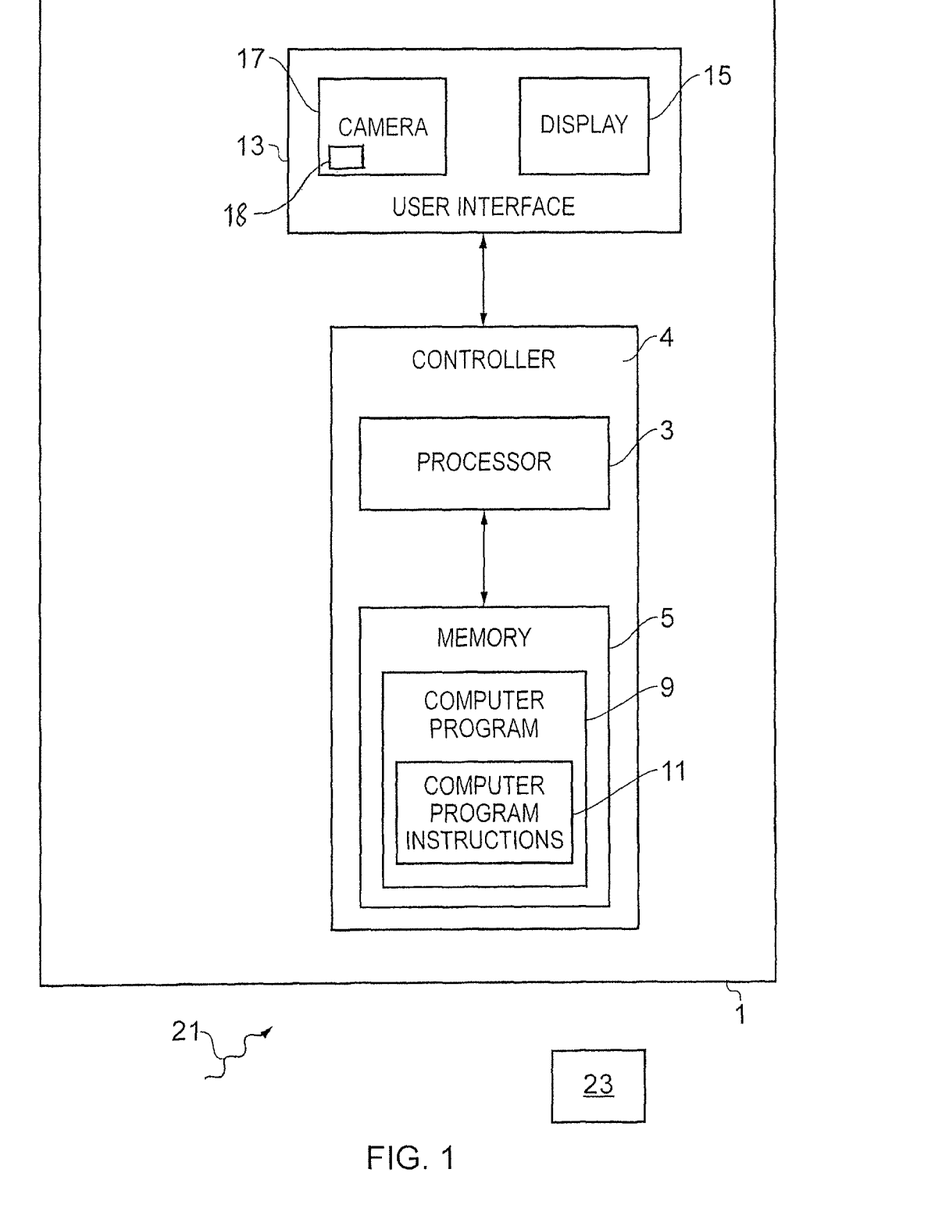
FIG. 1 schematically illustrates an apparatus according to an exemplary embodiment of the invention.

FIG. 1 schematically illustrates an apparatus 1 according to an embodiment of the invention. The apparatus 1 may be an electronic apparatus. The apparatus 1 may be, for example, a mobile cellular telephone, a personal computer, a camera, a gaming device, a personal digital assistant, a personal music player or any other apparatus which enables a user to make user inputs to control the apparatus 1. The apparatus 1 may be a handheld apparatus 1 which can be carried in a user's hand, handbag or jacket pocket for example.

Only features referred to in the following description are illustrated in FIG. 1. However, it should be understood that the apparatus 1 may comprise additional features that are not illustrated. For example, in embodiments of the invention where the apparatus 1 is a mobile cellular telephone, the apparatus 1 may also comprise a transmitter and receiver configured to enable wireless communication. The apparatus may also comprise additional user input means which enable a user to make different types of user inputs.

The apparatus 1 illustrated in FIG. 1 comprises: a user interface 13 and a controller 4. In the illustrated embodiment the controller 4 comprises at least one processor 3 and at least one memory 5 and the user interface 13 comprises a display 15 and a camera 17.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet. In embodiments of the invention where the apparatus 1 is a gaming device the controller 4 may be configured to control the apparatus 1 to display a gaming environment on the display 15 and enable a user to control participants within the gaming environment.

The controller 4 may also be configured to enable the apparatus 1 to detect, using a camera 17, motion of a user input object 35; and determine, for performance, a function corresponding to the detected motion of the user input object 35 wherein the function comprises control of an entity 39 within a three dimensional model.

The at least one processor 3 is configured to receive input commands from the user interface 13 and also to provide output commands to the user interface 13. The at least one processor 3 is also configured to write to and read from the at least one memory 5. Outputs of the user interface 13 may be provided as inputs to the controller 4.

The user interface 13 provides means for enabling a user of the apparatus 1 to input information which may be used to control the apparatus 1. The user interface 13 may also enable a user to input information which may be stored in the one or more memories 5 of the apparatus 1. The user interface 13 may comprise any means which enables a user to input information into the apparatus 1. For example the user interface 13 may comprise a keypad or a portion of a touch sensitive display or a combination of a number of different types of user input devices.

The display 15 may comprise any means which enables information to be displayed to a user of the apparatus 1. The information may correspond to information which has been input by the user via the user interface 13, information which is stored in the one or more memories 5 or information which has been received by apparatus 1. The display 15 may also be configured to display images which have been captured by the camera 17. In some embodiments of the invention the display 15 may be configured to display three dimensional images.

The camera 17 may comprise any means for capturing an image. The camera 17 may be configured to detect light from the visible range of the spectrum which is emitted by an object positioned in front of the lens of the camera 17. The camera 17 may comprise an image sensor which is configured to convert the detected light into an electrical signal. For example the camera 17 may comprise a sensor such as a CMOS (complimentary metal oxide semiconductor) or CCD (charge coupled device).

In some embodiments of the invention, the camera 17 may be configured to capture depth information. For example the camera 17 may be a Z-depth camera or a time-of-flight camera.

In other exemplary embodiments of the invention the camera 17 may be configured to capture three dimensional images. For example the camera 17 may be a stereo camera.

The stereo camera 17 may comprise a plurality of lenses.18. Each of the lenses 18 may have its own image sensor to enable each lens to capture an image independently of the other lenses 18 so that stereo camera 17 may be used to capture three dimensional images.

The camera 17 may be configured to obtain video images which may be used to detect motion of an object in front of the lens of the camera 17. The images captured by the camera 17 may be displayed on the display 15. In some embodiments of the invention the lens of the camera 17 may be provided on an opposing side of the apparatus 1 to the display 15. This enables the user of the apparatus 1 to clearly view the images displayed on the display 15 when they are using the camera 17.

In some embodiments of the invention the apparatus 1 may comprise more than one camera 17. For example, the apparatus 1 may comprise two cameras 17 which are provided on opposite sides of the apparatus 1. For example, the apparatus 1 may comprise a first camera 17 provided on an opposing side of the apparatus 1 to the display 15 and a second camera 17 provided on the same side of the apparatus 1 as the display 15.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIG. 3. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for detecting, using a camera 17, motion of a user input object 35; and means for determining, for performance, a function corresponding to the detected motion of the user input object 35 wherein the function comprises control of an entity 39 within a three dimensional model.

The computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code 9. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
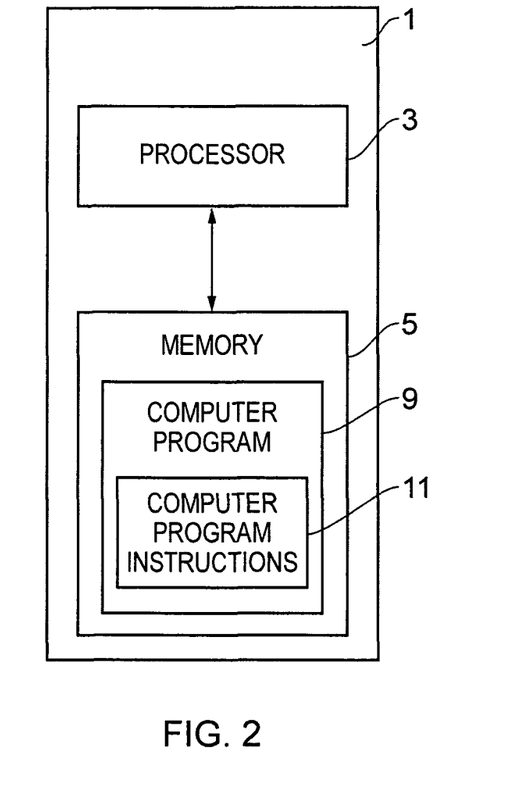
FIG. 2 schematically illustrates an apparatus according to another exemplary embodiment of the invention.

FIG. 2 illustrates an apparatus 1' according to another embodiment of the invention. The apparatus 1' illustrated in FIG. 2 may be a chip or a chip-set. The apparatus 1' comprises at least one processor 3 and at least one memory 5 as described above in relation to FIG. 1.

Figure 3:
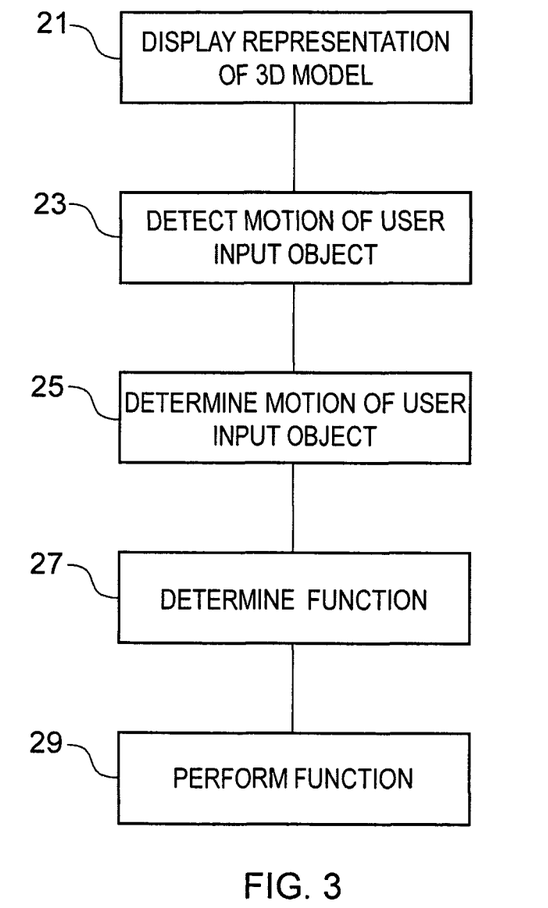
FIG. 3 is a block diagram which schematically illustrates a method according to an exemplary embodiment of the invention.

A method of controlling the apparatus 1, according to embodiments of the invention, is illustrated schematically in FIG. 3.

At block 21 the controller 4 controls the display 15 to display a graphical representation of a three dimensional model. The three dimensional model is a mathematical representation of a space and/or objects. The three dimensional model may comprise a three dimensional vector space which has depth, width and height. The three dimensional vector space may be defined by three dimensional orthogonal coordinates such as Cartesian coordinates, polar coordinate or cylindrical coordinates.

In some embodiments of the invention the three dimensional vector space may define a menu structure. Different user selectable items 41A, 41B, 41C may be positioned at different locations within the three dimensional vector space. The user may be able to control the apparatus 1 to navigate through the three dimensional vector space to view and select the various items 41A, 41B, 41C from the menu.

In other embodiments of the invention the three dimensional vector space may define a virtual environment. For example, in embodiments of the invention where the apparatus 1 may be used to play games the three dimensional environment may be a gaming environment and the user may be able to control participants and/or objects within the environment. Alternatively the virtual environment may comprise a virtual reality which is a realistic simulation of a real world environment. The user of the apparatus 1 may be able to use the apparatus 1 to interact with the virtual reality.

The three dimensional model may comprise one or more entities within the three dimensional vector space. One or more of the entities may be configured to be responsive to a user input made via the user interface 13 to enable a user to control the entity 39. In some embodiments of the invention the entity may be a three dimensional object having a depth, width and height within the three dimensional model. The user inputs which control the entity 39 may be made via the camera 17 as described below.

A user may control the entity 39 by moving the entity within the three dimensional space. For example, where the three dimensional vector space defines a menu structure the entity 39 may be a level of the menu and the user may be able to control the menu level 39 by rotating it or translating it so that they can view other items 41A, 41B, 41C in the menu level. In other embodiments of the invention the entity 39 may comprise a cursor which may be used to navigate through the three dimensional menu structure and highlight and select items 41A, 41B, 41C from the menu.

In other embodiments, for example, where the three dimensional vector space defines a gaming environment or a virtual reality, the entity 39 which is controlled by the user may be a participant within the gaming environment or the virtual reality.

In some embodiments of the invention a graphical representation of the entity which is controlled by the user may be displayed on the display 15. For example, where the entity is a cursor or a menu level this may be displayed on the display 15. In other embodiments of the invention the entity which is controlled by the user might not be displayed on the display 15, for example where the entity is participant within a gaming environment the representation of the three dimensional model which is displayed on the display 15 may correspond to the environment as it would be seen by the participant in the environment and so would not include a graphical representation of the actual participant itself.

At block 23 the controller 4 detects motion of a user input object 35 using the camera 35. The detection of the motion of the user input object 35 may be performed by a tracking module. The motion of the user input object 35 may be detected using any suitable process such as pattern recognition. For example, the user input object comprises patterns on the surface of the object. For instance, where the user input object 35 is a finger the fingerprint forms a pattern on the surface of the finger. The tracking module may be configured to detect these patterns and determine any change in the scale, orientation or location of the patterns.

It is to be appreciated that different types of cameras 17 may detect motion of the user input object 35 in different ways. As mentioned above, in some embodiments of the invention the camera 17 may be configured to capture depth information. In such embodiments of the invention the controller 4 may be configured to detect a change in the depth information when the user input object 35 is moved.

The motion of the user input object 35 may be three dimensional motion, for example it could comprise motion of the user input object 35 in any three orthogonal directions. The motion may comprise moving the user input object 35 towards or away from the lens of the camera 17, moving the user input object 35 in a plane which parallel with the back of the apparatus 1, rotating the user input object 35 or any combination of such movements.

The motion of the user input object 35 may be a specific gesture. For example, the motion may be a predetermined movement or a predetermined movement pattern comprising a series of movements. For example it could be making a circling motion of the user input object 35 or moving the user input object 35 from side to side. The specific gestures may be associated with specific functions of the apparatus 1 so that the specific function may be performed when the specific gesture is detected. It is to be appreciated that the function associated with a gesture may be dependent on the mode of operation and context of the apparatus 1.

The user input object 35 may comprise any part of a users hand 33, for example it may comprise one or more of a users fingers and thumbs. In other embodiments of the invention the user input object 35 may comprise an object such as a stylus.

In some embodiments of the invention, when the user is making the input via the camera 17, an image of the user input object 35 may be displayed on the display 15. This makes it easier for the user to control the entities within the three dimensional model.

At block 25 the controller 4 determines the motion of the user input object 35. The determining of the motion of the user input object 35 may be carried out by a gesture recognition module. The gesture recognition module may receive an input from the tracking module and determine how the user input object 35 has been moved. For example, it will determine the trajectory of the user input object 35 and whether or not this corresponds to a specific gesture.

At block 27 the controller 4 determines a function corresponding to the detected motion of the user input object 35. The determining of the function may be carried out by a command processing module. The command processing module may receive an input from a gesture recognition module and determine the function associated with the received input. The command processing module may use any suitable process to determine the function associated with the detected motion of the user input object 35. For example, the command processing module may use a lookup table to associate specific gestures with specific functions.

The function may enable control of an entity 39 within the three dimensional model. In embodiments of the invention where the three dimensional vector space defines a menu structure the entity 39 may be a level of the menu and the function may enable the user to navigate through the menu level 39 by rotating it or translating it so that they can view other items 41A, 41B, 41C in the menu level. In other embodiments of the invention the entity 39 may comprise a cursor and the function may enable the user to move the cursor to other parts of the menu or use the cursor to highlight or select menu items 41A, 41B, 41C.

In embodiments of the invention where the three dimensional vector space defines a gaming environment or a virtual reality, the entity 39 may be a participant within the gaming environment or the virtual reality and the function may be an action carried by the participant. Alternatively the entity 39 may comprise an object and the function may be movement of the object within the three dimensional vector space.

The function associated with the detected motion of the user input object 35 may depend on the mode of operation of the apparatus 1. For example if the apparatus 1 is in a game playing mode the detected motion may enable a participant in the game to perform an action whereas when the apparatus 1 is in a menu the same detected motion may enable a menu item to be selected.

The function associated with the detected motion of the user input object 35 may also depend on the context of the apparatus 1. For example, it may depend on the specific game which the user is playing or gaming characteristics of the participant which the user is controlling.

At block 29 the controller 4 enables the determined function to be performed. The graphical representation of the three dimensional model which is displayed on the display 15 may be updated as a consequence of performance of the function.

Figure 4A:
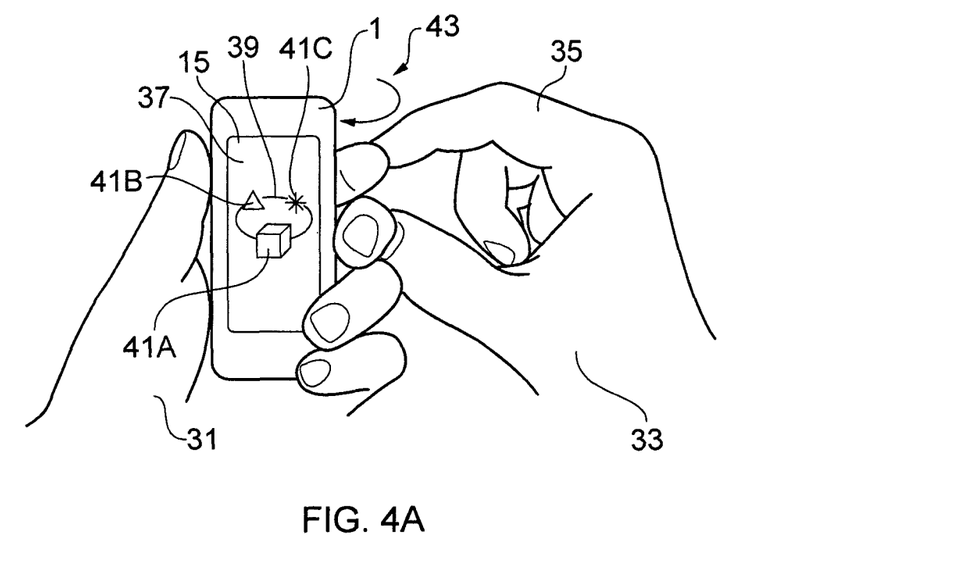
FIGS. 4A to 4B illustrate an exemplary embodiment of the invention in use.
Figure 4B:
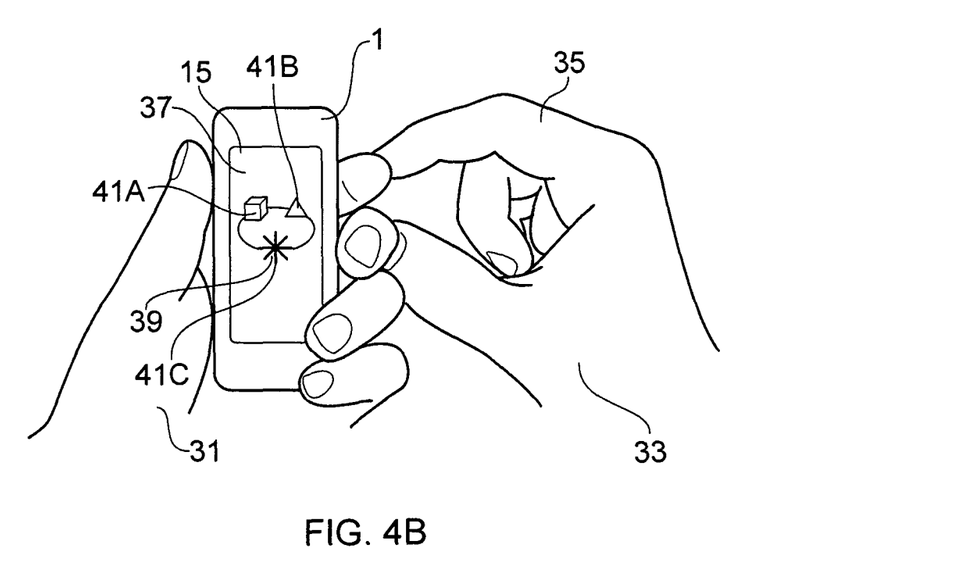

FIGS. 4A and 4B illustrate an exemplary embodiment of the invention in use. In the embodiment of the invention illustrated in FIGS. 4A and 4B the apparatus 1 is a handheld apparatus such a mobile telephone. The apparatus 1 illustrated in FIGS. 4A and 4B comprises a display 15 and a camera 17. The display 15 is positioned on the opposite side of the apparatus 1 to the camera 17 so that the camera 17 is not shown in the orientation illustrated in FIGS. 4A and 4B. The positioning of the camera 17 relative to the display 15 ensures that the user does not obstruct their own view of the display 15 when they are using the camera 17 to make inputs.

In the illustrated embodiment the user is holding the apparatus 1 in their left hand 31 and using their right hand 33 to make control inputs via the camera 17.

In FIG. 4A a graphical representation 37 of a three dimensional model is displayed on the display 15. In the exemplary embodiment the three dimensional model comprises a three dimensional menu structure. The menu structure comprises a plurality of items 41A, 41B, 41C which may be highlighted and selected by a user. The items 41A, 41B, 41C are distributed throughout the three dimensional menu structure so that each item 41A, 41B, 41C is positioned at a different location within the three dimensional model. The items 41A, 41B, 41C may be distributed so that they are positioned at different relative height, widths and/or depths within the three dimensional model. The graphical representation 37 of the menu structure which is displayed on the display 15 may comprise all of the menu level 39 or just a portion of the menu level 39. The relative position and size of the items 41A, 41B, 41C in the graphical representation may be indicative of the relative positions of the items 41A, 41B, 41C within the three dimensional model.

In the embodiment illustrated in FIG. 4A the menu items 41A, 41B, 41C are positioned around the diameter of a circle. In the graphical representation 37 displayed on the display 15 the circle is in a horizontal configuration so that a first item 41A is positioned on the point of the circle which is closest to the user and the other items 41b, 41C are positioned further away from the user. As the first item 41A is closer to the user, the icon representing the first item 41A is larger than the icons representing the other items 41B, 41C.

In FIG. 4A the user is making an input by moving a user input object 35 in front of the lens of the camera 17. In this exemplary embodiment the user input object 35 is the index finger of the user's right hand 33. It is to be appreciated that any other suitable user input object 35 could also be used.

In FIG. 4A the user is moving their index finger 35 by making a circling motion in a clockwise direction as indicated by the arrow 43. The controller 4 detects the motion of the user input object 35 and determines the function corresponding to the detected motion.

In the illustrated embodiment the function associated with the detected circling motion is rotating the circle of the menu level 39 so that one of the other menu items 41B, 41C is closer to the user.

In FIG. 4B the controller has controlled the apparatus to perform the function. The circle of the menu level has been rotated so that in the graphical representation 37 displayed on the display 15 in FIG. 4B a second item 41C is positioned closest to the user and is larger than the first item 41A and the other item 41B.

In other embodiments of the invention other motions of the user input object 35 may be used. For example a user may select an item 41A, 41B, 41C from the menu level 39 by waving their index finger 35 from side to side, or a user may zoom in on a menu level 39 by moving their finger 35 closer to the lens of the camera 17 or zoom out of the menu level 39 by moving their finger 35 further away from the lens of the camera 17. In some embodiments a user may rotate the circle of the menu level by waving their finger 35 from side to side. This gesture may imitate the real life motion of pushing a carousel to rotate it and so may be an intuitive input for a user to make. In such an embodiment the user may also select an item 41A, 41B, 41C from the menu level by moving their finger 35 closer to the lens. This gesture may imitate the motion of selecting an item by pushing a button and so may also be an intuitive input for a user to make.

Figure 5:
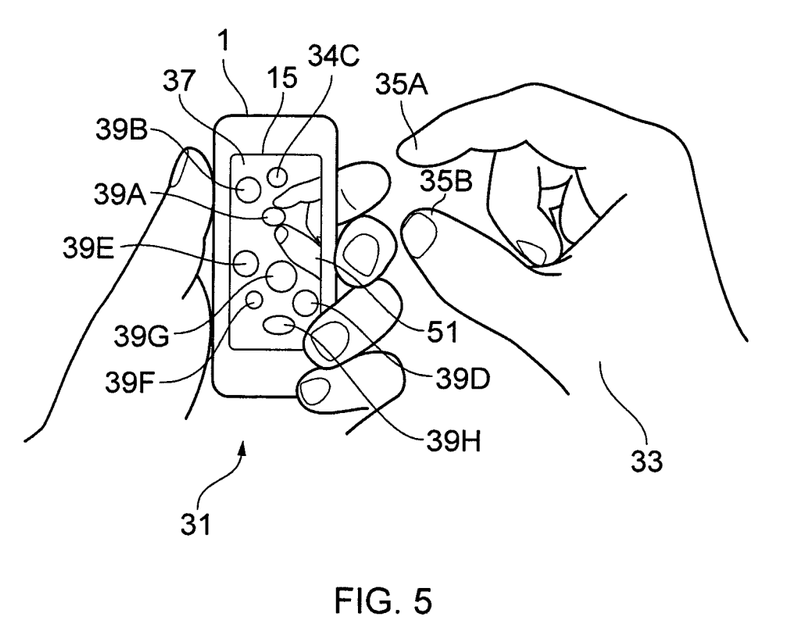
FIG. 5 illustrates another exemplary embodiment of the invention in use.

FIG. 5 illustrates another exemplary embodiment of the invention in use. In the embodiment of the invention illustrated in FIG. 5 the apparatus 1 is also a handheld apparatus such a mobile telephone which comprises a display 15 and a camera 17. The display 15 is positioned on the opposite side of the apparatus 1 to the camera 17 so that the camera 17 is not shown in the orientation illustrated in FIG. 5.

In the illustrated embodiment the user is holding the apparatus 1 in their left hand 31 and using their right hand 33 to make control inputs via the camera 17.

In FIG. 5 a graphical representation 37 of a three dimensional model is displayed on the display 15. In the exemplary embodiment the three dimensional model comprises a plurality of entities 39 A to H. The entities 39 A to H are objects which may be moved by the user within the three dimensional model. The three dimensional model may represent a gaming environment.

The entities 39 A to H are distributed throughout the three dimensional model so that each entity 39 A to H is positioned at a different location within the three dimensional model. As in the previously described embodiment the entities 39 A to H may be distributed so that they are positioned at different relative heights, widths and/or depths within the three dimensional model. The relative position and size of the entities 39A to H in the graphical representation 37 may be indicative of the relative positions of the entities 39 A to H within the three dimensional model.

In FIG. 5 the user is making an input by moving a user input object 35 in front of the lens of the camera 17. In this exemplary embodiment the user input object 35 comprises both the first finger 35A and the thumb 35B of the user's right hand 33.

A graphical representation 51 of the user input object 35 is displayed on the display 15. The graphical representation 51 of the user input object 35 is provided within the graphical representation 37 of the three dimensional model. The graphical representation 51 of the user input object 35 may comprise an image of the user input object 35 captured by the camera 17 and may move as the real user input object 35 moves. In other embodiments of the invention other types of visual indication may be provided, for example, a cursor.

The graphical representation 51 of the user input object 35 may enable a user to control objects within the three dimensional model as it may provide an indication to the user of the positions of the objects within the model relative to the position of the user input object 35.

In the embodiment illustrated in FIG. 5 the motion of the user input object 35 may comprise motion of the finger 35A and thumb 35B relative to the apparatus 1 and also motion of the finger 35A and thumb 35B relative to each other. This may provide a large number of potential user inputs.

In the particular embodiment illustrated in FIG. 5 the movement of the finger 35A and thumb 35B closer together in a pinch action enables a user to hold an entity 39A in the three dimensional model. When the user holds an entity 39A the entity 39A becomes associated with the user input object 35 so that whenever the graphical representation 51 of the user input object 35 is moved through the three dimensional model the entity 39A is also moved through the model with the user input object 35.

The movement of the finger 35A and thumb 35B away from each other enables the entity 39A to be released. Once the entity has been released from the hold it is no longer associated with the user input object 35 so the user input object 35 may be moved without causing any movement of the entities 39A.

This action enables a user to move the entities 39 A to H throughout the three dimensional model. The action imitates a real life action of holding an object and moving it from one place to another and so it may be an intuitive action for a user to make.

Embodiments of the invention provide the advantage that they enable a user to control an apparatus 1 using inputs which are intuitive to the user. As the user inputs may comprise three dimensional motion they may correspond directly to the control of an entity 39 within a three dimensional model. For example motion in any of the three orthogonal directions which define the vector space may be mapped directly to movement of the entity 39 within the three dimensional model. This makes the apparatus 1 more intuitive for a user to use.

Also the user input may be made using a camera module. As many apparatus 1 such as mobile telephone already comprise a camera module embodiments of the invention may be implemented without significantly increasing the amount of hardware of an apparatus.

The blocks illustrated in the FIG. 3 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example in the above described embodiments the three dimensional model is described as being a menu structure or a gaming environment or a virtual reality or a mixed reality. It is to be appreciated that the embodiments of the invention may be applied to other functions of an apparatus 1. For example, the user may wish to draw and create objects within a three dimensional model using inputs which are detected via the camera.

In some embodiments of the invention, the display 15 and the camera 17 may be positioned on the same side of the apparatus 1. In such embodiments of the invention the user input object 35 may be poisoned between the user and the apparatus 1 so that, in use, the user input object is moved in front of both the display 15 and camera 17. The display 15 may be configured to display a graphical representation 37 of a three dimensional model. The graphical representation 37 of the three dimensional model may be displayed in a way that at least part of the three dimensional model is perceived to be in front of the display 15.

The three dimensional model may comprise one or more entities. The detected position and/or motion of the user input object 35 may be used to enable a user to control the one or more entities within the three dimensional model. For example, the one or more entities may be associated with the user input object 35 so that when the user input object 35 is moved in front of the camera the entity 39A is also moved through the three dimensional model with the user input object 35. In this illustrative embodiment, a graphical representation of the user input object 35 might not be displayed, since the user input object 35 is in front of the display 15 and is visible to the user. This enables the user input object 35 to be perceived as merged or mixed into the three dimensional model.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus comprising:
   at least one processor; and
   at least one memory including computer program code;
   wherein the at least one memory and the computer program code are configured to, with the at least one processor, enable the apparatus to:
   cause presentation on a display of a three dimensional menu structure, wherein the three dimensional menu structure comprises a plurality of individually selectable items positioned at different locations defined by different relative heights, widths or depths within the three dimensional menu structure;
   detect, using a camera, motion of a user input object; and
   determine, for performance, a function corresponding to the detected motion of the user input object wherein the function comprises movement of the items of the three dimensional menu structure such that the items have different relative locations than prior to the movement and selection of an item of the three dimensional menu structure;
   wherein the camera is positioned on an opposite side of the apparatus to the display.

2. An apparatus as claimed in claim 1 wherein the three dimensional menu structure comprises a three dimensional vector space.

3. An apparatus as claimed in claim 2 wherein the plurality of items comprise a plurality of three dimensional entities within the three dimensional vector space.

4. An apparatus as claimed in claim 1 wherein the function also comprises control of an entity within the three dimensional menu structure, and wherein the entity which is controlled is a three dimensional entity and has depth, width and height.

5. An apparatus as claimed in claim 1 wherein the function also comprises control of an entity within the three dimensional menu structure, and wherein the entity which is controlled is a cursor which enables a user to select items within the three dimensional menu structure.

6. An apparatus as claimed in claim 5 wherein the function performed comprises selection of an item using the entity.

7. An apparatus as claimed in claim 1 wherein the function also comprises control of an entity within the three dimensional menu structure, and wherein the function performed comprises movement of the entity within the three dimensional menu structure.

8. An apparatus as claimed in claim 7 wherein the movement comprises translation of the entity.

9. An apparatus as claimed in claim 7 wherein the movement comprises rotation of the entity.

10. An apparatus as claimed in claim 1 wherein the user input object comprises part of the user's hand.

11. An apparatus as claimed in claim 10 wherein the user input object comprises one or more fingers.

12. An apparatus as claimed in claim 1 wherein the user input object comprises a stylus.

13. An apparatus as claimed in claim 1 wherein the detected motion of the user input object comprises three dimensional motion.

14. An apparatus as claimed in claim 1 wherein the detected motion of the user input object comprises a gesture.

15. An apparatus as claimed in claim 1 wherein the camera comprises a plurality of lenses, the plurality of lenses comprising a first lens and a remainder of the lenses such that the first lens is configured to enable an image to be captured independently of the remainder of the lenses.

16. An apparatus as claimed in claim 1 wherein the three dimensional menu structure initially presents a first item at a location closer to the a user than a second item and, following movement of the items, subsequently presents the second item at a location closer to the user than the first item.

17. An apparatus as claimed in claim 1 wherein the at least one memory and the computer program code are configured to, with the at least one processor, enable the apparatus to receive a selection of one or more of the plurality of individually selectable items.

18. A method comprising:
   displaying a representation of a three dimensional menu structure on a display of an apparatus, wherein the three dimensional menu structure comprises a plurality of individually selectable items positioned at different locations defined by different relative heights, widths or depths within the three dimensional menu structure;
   detecting, using a camera of the apparatus positioned on an opposite side of the apparatus to the display, motion of a user input object; and
   determining, for performance, a function corresponding to the detected motion of the user input object wherein the function comprises movement of the items of the three dimensional menu structure such that the items have different relative locations than prior to the movement and selection of an item of the three dimensional menu structure.

19. A method as claimed in claim 18 wherein the three dimensional menu structure comprises a three dimensional vector space.

20. A non-transitory computer readable medium embodying a computer program comprising computer program instructions that, when executed by at least one processor, enable an apparatus at least to perform:
   displaying a representation of a three dimensional menu on a display of an apparatus, wherein the three dimensional menu structure comprises a plurality of individually selectable items positioned at different locations defined by different relative heights, widths or depths within the three dimensional menu structure;
   detecting, using a camera of the apparatus positioned on an opposite side of the apparatus to the display, motion of a user input object; and
   determining, for performance, a function corresponding to the detected motion of the user input object wherein the function comprises movement of the items of the three dimensional menu structure such that the items have different relative locations than prior to the movement and selection of an item of the three dimensional menu structure.

* * * * *